United States Patent [19]

Feenstra et al.

[11] 4,421,706
[45] Dec. 20, 1983

[54] METHOD OF MANUFACTURING PRINTING HEADS FOR INK JET PRINTERS

[75] Inventors: Johannes Feenstra; Hermanus N. Tuin; Antonie Schrederhof, all of Eindhoven, Netherlands

[73] Assignee: U.S. Philips Corporation, New York, N.Y.

[21] Appl. No.: 359,644

[22] Filed: Mar. 19, 1982

[30] Foreign Application Priority Data

Apr. 24, 1981 [NL] Netherlands .................. 8102026

[51] Int. Cl.³ ............................................. B29C 17/10
[52] U.S. Cl. ..................................... 264/157; 264/261
[58] Field of Search ..................... 264/157, 261, 1.5

[56] References Cited

U.S. PATENT DOCUMENTS

| | | | |
|---|---|---|---|
| 2,608,722 | 9/1952 | Stuetzer | 264/1.5 |
| 3,043,910 | 7/1962 | Hicks | 264/1.5 |
| 3,156,950 | 11/1964 | Walton | 264/157 |
| 3,157,721 | 11/1964 | Barish | 264/157 |
| 3,832,579 | 8/1974 | Arndt | 310/8.1 |
| 3,853,658 | 12/1974 | Ney | 264/1.5 |
| 4,095,238 | 6/1978 | Kattner et al. | 346/140 R |

Primary Examiner—Donald E. Czaja
Assistant Examiner—Mary A. Becker
Attorney, Agent, or Firm—Norman N. Spain

[57] ABSTRACT

A bundle of parallel glass tubes (27) is passed through openings (29) in parallel alignment plates (5) which divide the bundle into a central portion (31) in a zone between the two alignment plates and two end portions (33) beyond this zone. Subsequently, the tubes are softened by heating and the central portion of the bundle is constricted. Subsequently, the central portion is embedded in a moulding compound which, when set, forms two coupling pieces (1) for printing heads, which coupling pieces can be separated from one another along a separating plane (37) which extends parallel to the alignment plates. Thus, important parts of at least two printing heads are manufactured simultaneously.

6 Claims, 5 Drawing Figures

METHOD OF MANUFACTURING PRINTING HEADS FOR INK JET PRINTERS

BACKGROUND OF THE INVENTION

The invention relates to a method of manufacturing printing heads for ink jet printers, which method comprises moulding of coupling pieces through each of which jet nozzle ducts extend from a rear portion of the coupling pieces to a front portion thereof, said jet nozzle ducts being situated nearer to one another in the front portion of the coupling piece than in the rear portion, and arranging a cylindrical pumping member around each jet nozzle duct near the rear portion of the coupling piece. The invention also relates to a printing head manufactured by such a method.

A printing head of this kind is known from German Auslegeschrift No. 25 43 420.

SUMMARY OF THE INVENTION

The invention has for its object to provide a method of manufacturing such printing heads which is very simple and quick and whereby substantial parts of at least two printing heads can be manufactured simultaneously. To this end, the method in accordance with the invention is characterized in that a bundle of glass tubes is passed through parallel openings in two parallel alignment plates, said openings being arranged in a spaced pattern which corresponds to the arrangement of the jet nozzle ducts at the rear of the coupling pieces to be formed, the alignment plates subdividing the bundle into a central portion which extends in a zone between the two alignment plates and two end portions which are situated outside this zone and whose length at least equals the length of the pumping member, after which the tubes are heated and the central portion of the bundle is constricted until at a position halfway between the two alignment plates, the tubes are arranged in a pattern which corresponds to the arrangement of the jet nozzle ducts at the front of the printing heads to be formed. After this at least the central portion of the bundle is encapsulated in a moulding compound. In order to form two coupling pieces after the setting of the moulding compound these coupling pieces are then separated from one another, according to a separating plane which is situated halfway between and parallel to the two alignment plates.

According to this method the coupling pieces for two printing heads are formed simultaneously, the coupling pieces being initially interconnected at their front ends and subsequently being separated. One version of the method in accordance with the invention is that the glass tubes of at least one of said bundles are integral, with the corresponding glass tubes of a further bundle, the glass tubes being joined at their end portions, these two end portions subsequently being separated from one another along a separating plane which extends parallel to the alignment plates and is situated at a distance from each of the two alignment plates bounding said two end portions of the tube bundles which at least equals the length of the pumping members. With this version the continuous production of an arbitrary even number of coupling pieces is possible.

By use of a further version of the method in accordance with the invention the simultaneous manufacture of at least two substantially complete printing heads is possible. This version is characterized in that prior to the constriction of the central portion of the or each bundle, pumping members are arranged around the portions of the tubes which are situated in the end portions of the bundle.

A printing head in accordance with the invention is characterized in that an alignment plate is arranged between the coupling piece and the pumping section.

DESCRIPTION OF THE PREFERRED EMBODIMENTS

The invention will now be described in greater detail with reference to the drawings.

Figure 1:
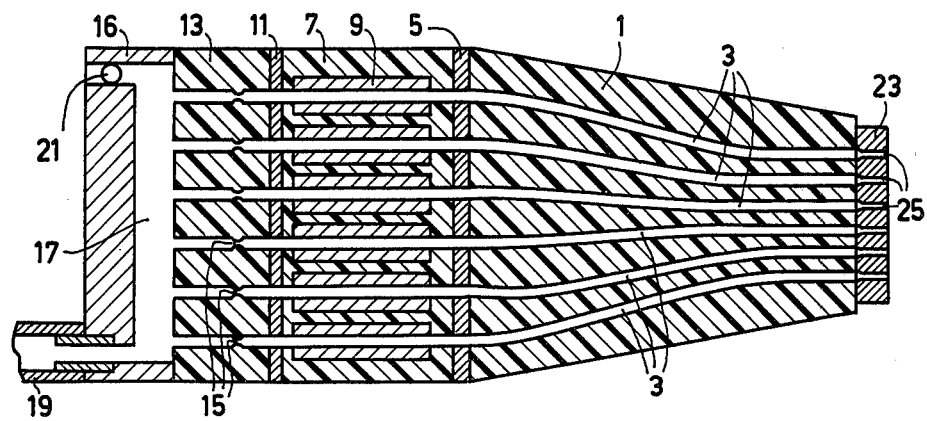
FIG. 1 is a diagrammatic longitudinal sectional view of an embodiment of a printing head in accordance with the invention.

The printing head which is shown in FIG. 1 comprises a coupling piece 1 which is made of a moulding compound and through which jet nozzle ducts 3 extend. The moulding compound is preferably a plastics material but other materials such as plaster of Paris and metals having a low melting point are also suitable. Each jet nozzle duct 3 extends from a rear end of the coupling piece 1 (at the left in FIG. 1) to a front end (at the right in FIG. 1). The jet nozzle ducts 3 are situated nearer to one another in the front portion of the coupling piece than in the rear portion.

At the rear end of the coupling piece 1 there is arranged an alignment plate 5 whose function will be described hereinafter. The jet nozzle ducts 3 continue into a pumping section 7 which is situated behind the alignment plate 5 and in which each jet nozzle duct is surrounded by a cylindrical pumping member 9. Each pumping member 9 may consist of a piezoelectric ceramic tube which comprises electrodes on its inner and outer walls and which is secured to the jet nozzle duct 3 by means of an adhesive. Pumping members of this kind are known, for example, from U.S. Pat. No. 3,832,579.

Behind the pumping section 7 there is arranged an end plate 11 whose function will also be described in detail hereinafter and which is followed by a rear portion 13 of the printing head. The part of each jet nozzle duct 3 which extends through the rear portion 13 comprises a constriction 15. In the embodiment shown, the pumping section 7 and the rear portion 13 are also moulded in, for example, a plastics material.

The alignment plate 5 and the end plate 11 may be made of any suitable material such as metal, glass or plastics.

To the rear of the printing head there is secured a connection piece 16 which contains an ink supply duct 17 which communicates with the rear openings of the jet nozzle ducts 3. The ink supply duct 17 can be connected to an ink reservoir (not shown) via a tube 19 and can be vented via a venting device 21.

To the front of the printing head there is secured a jet nozzle plate 23 which comprises jet nozzles 25 in which front openings of the jet nozzle ducts 3 open.

The operation of the described printing head is known per se, so it will only be briefly described herein. Via the ink supply duct 17 the jet nozzle ducts 3 are filled with ink. When one of the pumping members 9 is actuated, a pressure wave is formed in the associated jet nozzle duct. Due to the constriction 15, the ink displacement occurring in the duct due to this pressure wave cannot be directed backwards, so that part of the ink is displaced forwards and escapes as an ejected droplet via the associated jet nozzle 25. This droplet is directed onto a sheet of paper arranged in front of the printing head, and forms, for example, an element of a character. In order to enable characters to be formed arbitrarily by means of such elements, the jet nozzles 25 are arranged, for example, in a matrix of six rows and four columns. Alternatively, the jet nozzles may be arranged in one column, the printing head then being intermittently displaced in operation in a direction perpendicular to said column in order to form a character.

Figure 2:
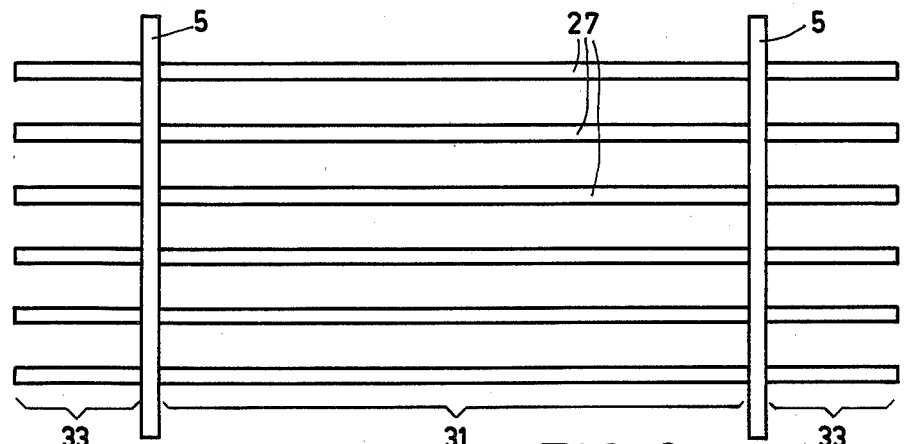
FIG. 2 is a side elevation of an assembly of glass tubes and alignment plates during an initial stage in the method in accordance with the invention.
Figure 3:
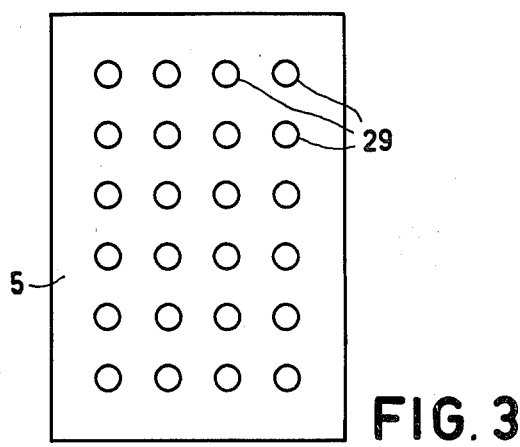
FIG. 3 is a front view of an alignment plate.

In the manufacture of a printing head of this kind by means of the method in accordance with the invention glass tubes are used which ultimately form the jet nozzle ducts 3. FIG. 2 shows the glass tubes 27 arranged mutually parallel in a bundle, for which purpose they are passed through openings in two alignment plates 5. The two alignment plates 5 are arranged in parallel at a distance from one another. The arrangement of the openings are as shown in FIG. 3 which is a front view of one of the alignment plates 5 so that the openings 29 are visible. These openings are arranged in a matrix of six rows and four columns which corresponds to the arrangement of the jet nozzle ducts 3 at the rear of the coupling pieces 1 to be formed.

The two alignment plates 5 divide the bundle of glass tubes into a central portion 31 which extends between the two alignment plates and two end portions 33 which are situated beyond the alignment plates. In FIG. 2 the two end portions 33 have a limited length which at least equals the length of the pumping members 9 but which need not be much larger.

Subsequently, at least the central portion 31 of the tubes 27 is heated beyond the softening point, after which the central portion of the bundle is constricted by means of a suitable tool until halfway between the two alignment plates 5 the tubes 27 are arranged in a pattern which corresponds substantially to the arragement of the jet nozzle ducts 3 at the front of the printing heads to be formed, and hence also to the arrangement of the jet nozzles 25. The arrangement of the jet nozzle ducts 3 at the area of constriction 31 generally results in a pattern of openings which may be represented by the pattern of the openings 29 in the alignment plate 5 as shown in FIG. 3 but in a reduced scale.

Figure 4:
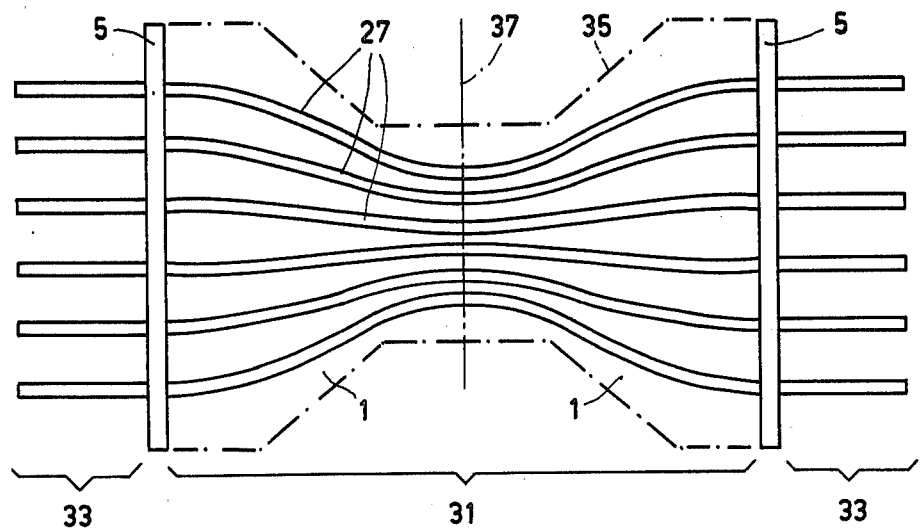
FIG. 4 is a side elevation of the assembly of FIG. 2 at a later stage in the method.

The result of the constriction of the central portion 31 is shown in FIG. 4. The constricted central portion 31 is subsequently embedded in a plastics material such as an epoxy resin in a suitable mould so that a moulding 35 is obtained (denoted by stroke/dot lines). This moulding forms two coupling pieces 1 which are separated from one another after the setting of the plastics material, according to a separating plane 37 which is denoted by a broken line. The separating plane extends parallel to and halfway between the two alignment plates 5. Separation can be realized, for example, by sawing the central portion 31 or by scratching a groove in the surface of the central portion and by subsequently breaking the central portion. The surfaces formed by the separation can subsequently be finished, if necessary, for example, by polishing. Jet nozzle plates 23 can be fixed on these surfaces, for example, by means of an adhesive. The portions of the tubes 27 which are situated in the end portions 33 of the bundle of tubes are subsequently provided with the pumping members 9. Behind these pumping members constrictions 15 can be formed in the tubes, but it is alternatively possible to connect to the near ends of the tubes 27 further tubes, for example, rubber tubes, in which the consrictions have been preformed. The printing head, or at least the portion thereof which is situated behind the alignment plate 5, can subsequently be arranged in a protective housing (not shown).

Figure 5:
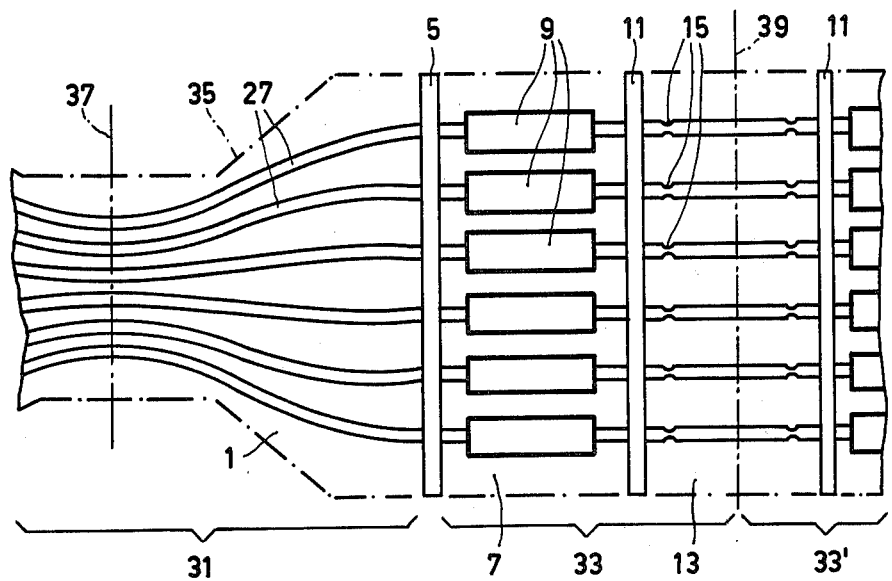
FIG. 5 is a side elevation of a similar assembly, again at a later stage in a version of the method in accordance with the invention.

Many variations of the above-described method are feasible, some of which will be described with reference to FIG. 5. Like FIG. 4, FIG. 5 is a side elevation of a bundle of glass tubes 27 after the constriction of the central portion 31 of the bundle. However, in this case the bundle is the first of a continuous succession of tube bundles formed of continuous glass tubes, so that the tubes in the right end portion 33 of the first bundle integrally adjoin the tubes in the left end portion 33' of the next bundle. The manufacturing process may then be continuous in that the tubes 27 are moved to the left each time over a distance which corresponds to the length of a central portion 31 plus two end portions 33 of a tube bundle after which the central portion 31 of the first bundle is constricted and the moulding 35 is formed thereon, the moulding and tube bundle are then divided along the plane 37, and subsequently the right end portion 33 of the bundle is separated from the adjoining left end portion 33' of the next tube bundle along a plane 39 which extends parallel to the alignment plates 5 and is situated midway between the two alignment plates which bound the adjoining end potions 33 and 33' of the two adjoining tube bundles. The distance between the plane 39 and each of these two alignment plates 5 must be at least equal to the length of the pumping members 9. If desired, this distance can be large enough to allow not only the portions of the jet nozzle ducts 3 which are situated within the pumping section 7 of the printing head but also the portions which are situated in the rear portion 13 of the printing head to be formed from the tubes 27 so as to be integral with the portions of the ducts which are situated within the coupling piece 1. At a suitable instant the portions of the tubes which are situated in the end portions 33 of the bundle are each formed with a constriction 15 at a distance from the nearer alignment plate 5 which is larger than the length of the pumping members 9.

In order to give a more rigid support to the portions of the tubes 27 which are situated within the end portions 33 of the tube bundle, the tubes in each end portion are preferably passed through openings in an end plate 11 which is arranged parallel to the alignment plates 5. The distance between each end plate 11 and the nearer alignment plate 5 must be at least equal to the length of the pumping members 9. The openings in each end plate 11 are arranged in a pattern which is similar to that of the openings 29 in each alignment plate 5 (see FIG. 3). If desired, the two patterns may be completely identical.

An example of the continuous process for the manufacture of the printing heads is as follows. The front ends of the tubes 27 are passed successively through a first end plate 11, a first group of pumping members 9, a first alignment plate 5, a second alignment plate 5, a second group of pumping members 9 and a second end plate 11 to form a first bundle of tubes. The central portion 31 of this bundle of tubes is subsequently constricted and constrictions 15 are formed in those portions of the tubes which are located in the end portions 33 of the bundle, outside the end plates 11. Subsequently, the moulding 35 is formed. The moulding may extend from the front ends of the tubes 27 as far as the location of the separating plane 39 between the first tube bundle and the next tube bundle. Thus, two substantially complete printing heads are formed which merely require separation and finishing. It is alternatively possible to manufacture two, four or a greater even number of printing heads simultaneously by means of this method by increasing accordingly the number of first and second end plates 11, first and second groups of pumping members 9 and first and second alignment plates 5 through which the tubes 27 are passed and by extending the moulding 35 over the succession of tube bundles thus formed.

It can be seen from the foregoing that the method in accordance with the invention offers a large range of possibilities from the simple manufacture of coupling pieces two at a time followed by the individual mounting of the end plates, alignment plates and pumping members, up to and including the continuous manufacture of an arbitrary number of substantially complete printing heads.

What is claimed is:

1. A method of manufacturing printing heads for ink jet printers by forming moulded coupling pieces (1) for conveying a liquid from a reservoir (17) containing said liquid to jet nozzles (25) for ejecting said liquid, each of said coupling pieces containing jet nozzle ducts (3) extending from said reservoir to said jet nozzles which ducts in each coupling piece are closer to each other in the area adjacent to the jet nozzles then in the area adjacent to the reservoir and positioning around each jet nozzle duct a cylindrical pumping member (9) in an area closer to the reservoir then to the jet nozzles, characterized in that:

(1) a bundle of parallel glass tubes (27) are positioned so as to extend through corresponding openings (29) contained in two spaced parallel alignment plates (5), the openings in each of said plates corresponding to the desired arrangement of the jet nozzle ducts, said alignment plates dividing said bundle into a central portion (31) extending between said two alignment plates and two end portions (33), each of said end portions being situated outside of said central portion and each having a length at least equal to the length of said pumping members;

(2) heating said bundle sufficiently to soften said glass tubes;

(3) constricting the thus softened glass tubes in said central portion in a manner such that the tubes are closest to each other along a separation plane (37) about halfway between, and extending parallel to, said two alignment plates to thereby form a pattern corresponding to the desired arrangement of the jet nozzles at the front of two coupling pieces, said coupling pieces being joined, one to the other, at the front of the jet nozzles;

(4) embedding at least said central portion of said bundle in a molding composition and setting said molding composition thereby forming two coupling pieces joined together at the front of said jet nozzles; and (5) then separating said coupling pieces from each other along said separation plane (37) thereby forming two separate coupling pieces.

2. A method as claimed in claim 1 characterized in that the tubes in at least one of the end portions (33) of the bundle are integral with the corresponding tubes in an end portion (33') of a further bundle of parallel glass tubes positioned along a common axis and positioned so as to extend through corresponding openings in parallel alignment plates, said two end portions subsequently being separated from one another along a separation plane (39) which extends parallel to the alignment plates and is situated at a distance from each of the two alignment plates surrounding said two end portions of the two bundles which at least equals the length of the pumping members.

3. A method as claimed in claim 1 or 2, characterized in that prior to the constriction of the central portion (31) of the or each bundle, pumping members (9) are arranged around the portions of the tubes (27) which are situated in the end portions (33) of the bundle.

4. A method as claimed in claim 3 characterized in that the tubes in each end portion of each bundle are positioned so as to extend through openings in an end plate (11) arranged parallel to the alignment plates and are joined to each other in the area between said end plates, the distance from each end plate to the nearest alignment plate being at least equal to the length of the pumping members and the openings in each end plate being arranged in a pattern which is similar to that of the openings in each alignment plate.

5. A method as claimed in claim 4, characterized in that the portions of the or each bundle which are situated between the alignment plates (5) and the end plates (11) are embedded in the moulding compound at the same time as the central portion (31) of the bundle.

6. A method as claimed in claim 1, characterized in that the portions of the tubes (27) which are situated within the end portions (33) of each bundle are each provided with a constriction (15) at a distance from the nearest alignment plate (5) which is larger than the length of the pumping members (9).

* * * * *